US012483821B2

(12) United States Patent
Yang et al.

(10) Patent No.: US 12,483,821 B2
(45) Date of Patent: Nov. 25, 2025

(54) SOUND GENERATING APPARATUS

(71) Applicant: Luxshare Precision Industry Company Limited, Shenzhen (CN)

(72) Inventors: Wei Yang, Shenzhen (CN); Xiaolong Liu, Shenzhen (CN); Weiqiang Yao, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 293 days.

(21) Appl. No.: 18/378,801

(22) Filed: Oct. 11, 2023

(65) Prior Publication Data

US 2025/0008253 A1 Jan. 2, 2025

(30) Foreign Application Priority Data

Jun. 27, 2023 (CN) ........................ 202310770577.X

(51) Int. Cl.

| | |
|---|---|
| ***H04R 1/10*** | (2006.01) |
| ***H04R 1/02*** | (2006.01) |
| ***H04R 1/24*** | (2006.01) |
| ***H04R 1/28*** | (2006.01) |

(52) U.S. Cl.

CPC ........... *H04R 1/105* (2013.01); *H04R 1/1091* (2013.01); *H04R 2460/11* (2013.01)

(58) Field of Classification Search

CPC . H04R 1/02; H04R 1/021; H04R 1/10; H04R 1/1008; H04R 1/1016; H04R 1/105; H04R 1/1058; H04R 1/1066; H04R 1/1075; H04R 1/1091; H04R 1/24; H04R 1/28; H04R 1/2803; H04R 1/2823;

(Continued)

(56) References Cited

U.S. PATENT DOCUMENTS 6,668,064 B1 * 12/2003 Lin ...................... H04R 1/1016 381/328
6,704,429 B2 * 3/2004 Lin ...................... H04R 1/1016 379/430

(Continued)

FOREIGN PATENT DOCUMENTS

CN 102938868 A * 2/2013
CN 203708464 U * 7/2014

(Continued)

*Primary Examiner* — Edgardo San Martin

(74) *Attorney, Agent, or Firm* — Birch, Stewart, Kolasch & Birch, LLP

(57) ABSTRACT

Provided is a sound generating apparatus including a rear housing, a speaker assembly, a front housing, and a vent frame. The rear housing is provided with an accommodation groove and a rear chamber groove. The outer wall of the rear housing is provided with a vent hole. The speaker assembly is disposed in the notch of the rear chamber groove and covers the rear chamber groove to form a rear sound chamber. A front sound chamber is formed on the side of the front housing. The vent frame and the rear housing are assembled to form a rear vent channel whose two ends communicate with the rear sound chamber and the vent hole. The vent frame and the front housing are assembled to form a front vent channel whose two ends communicate with the front sound chamber and the vent hole.

18 Claims, 5 Drawing Sheets

(58) Field of Classification Search
CPC .. H04R 1/2826; H04R 1/2846; H04R 1/2849; H04R 25/00; H04R 25/48; H04R 25/60
See application file for complete search history.

(56) References Cited

U.S. PATENT DOCUMENTS

| | | | | |
|---|---|---|---|---|
| 7,894,620 | B2 * | 2/2011 | Yang | H04R 1/021 381/345 |
| 10,063,962 | B2 * | 8/2018 | Bruss | H04R 1/2849 |
| 10,484,772 | B2 * | 11/2019 | Barrieau | H04R 1/1008 |
| 10,999,672 | B2 * | 5/2021 | Shen | H04R 1/2849 |
| 11,122,351 | B2 * | 9/2021 | Struzik | H04R 1/345 |
| 11,317,186 | B2 * | 4/2022 | Jou | H04R 1/1041 |
| 11,451,894 | B2 * | 9/2022 | Lin | H04R 1/1008 |
| 12,114,124 | B2 * | 10/2024 | Wu | H04R 1/1075 |
| 12,149,877 | B2 * | 11/2024 | Lee | H04R 1/1075 |
| 2002/0080990 | A1 * | 6/2002 | Lin | H04R 1/1016 381/372 |
| 2009/0180657 | A1 * | 7/2009 | Isvan | H04R 1/2849 381/371 |
| 2017/0006373 | A1 * | 1/2017 | Bruss | H04R 1/2849 |
| 2021/0337294 | A1 * | 10/2021 | Dory | H04R 1/1008 |
| 2024/0314487 | A1 * | 9/2024 | Razaei | G10K 11/17861 |
| 2024/0406618 | A1 * | 12/2024 | Wang | H04R 1/1008 |
| 2025/0113131 | A1 * | 4/2025 | Li | G02B 27/01 |

FOREIGN PATENT DOCUMENTS

| | | | | | |
|---|---|---|---|---|---|
| CN | 106454576 | A | * | 2/2017 | H04R 1/1058 |
| CN | 207443081 | U | | 6/2018 | |
| CN | 109309893 | A | * | 2/2019 | H04R 9/02 |
| CN | 209462551 | U | * | 10/2019 | |
| CN | 209882047 | U | * | 12/2019 | |
| CN | 110868659 | A | * | 3/2020 | H04R 1/02 |
| CN | 210469685 | U | * | 5/2020 | |
| CN | 111654791 | A | * | 9/2020 | H04R 9/025 |
| CN | 215871788 | U | * | 2/2022 | |
| CN | 118945547 | A | * | 11/2024 | H04R 1/10 |
| GB | 2445388 | A | * | 7/2008 | H04R 5/033 |

* cited by examiner

SOUND GENERATING APPARATUS

CROSS-REFERENCE TO RELATED APPLICATION

This application claims priority to Chinese Patent Application No. 202310770577.X filed Jun. 27, 2023, the disclosure of which is incorporated herein by reference in its entirety.

TECHNICAL FIELD

The present disclosure relates to the field of sound generating device technology and, in particular, to a sound generating apparatus.

BACKGROUND

In the existing headset, the spacing between a front sound chamber and a rear sound chamber is relatively large, a front vent channel communicating with the front sound chamber and a rear vent channel communicating with the rear sound chamber are disposed independently from each other, many structural components are provided, the assembly process is complicated, and the production and assembly costs are high. Furthermore, the front vent channel and the rear vent channel release sounds in different directions respectively. Thus, a communication port needs to be configured on the outer wall of the headset, which affects the appearance of the headset.

In addition, a microphone is configured in the inner chamber of the headset, so that the headset needs to be provided with a sound receiving channel communicating with the inner chamber of the headset. The sound receiving channel, the front vent channel, and the rear vent channel are independent from each other. Thus, a communication port needs to be configured on the outer wall of the headset, which affects the appearance of the headset.

SUMMARY

The object of the present disclosure is to provide a sound generating apparatus that can reduce the number of structural components, simplify the assembly process, reduce the production and assembly costs, and ensure the appearance of the product.

To achieve this object, the present disclosure adopts the technical solutions described below.

The sound generating apparatus includes a rear housing, a speaker assembly, a front housing, and a vent frame.

The rear housing is provided with an accommodation groove and a rear chamber groove. The outer wall of the rear housing is provided with a vent hole communicating with the accommodation groove.

The speaker assembly is disposed in the notch of the rear chamber groove and covers the rear chamber groove to form a rear sound chamber.

The front housing covers the rear housing. The speaker assembly is interposed between the front housing and the notch of the rear chamber groove. A front sound chamber is formed on the side of the front housing facing away from the speaker assembly.

The vent frame is disposed in the accommodation groove and interposed between the rear housing and the front housing. The vent frame and the rear housing are assembled to form a rear vent channel in an enclosing manner. One end of the rear vent channel communicates with the rear sound chamber, and another end of the rear vent channel communicates with the vent hole. The vent frame and the front housing are assembled to form a front vent channel in an enclosing manner. One end of the front vent channel communicates with the front sound chamber, and another end of the front vent channel communicates with the vent hole.

In an embodiment, the vent frame is further provided with a sound receiving channel. One end of the sound receiving channel communicates with the vent hole, and another end of the sound receiving channel communicates with the accommodation groove.

In an embodiment, the vent hole is in a strip shape. A position where the rear vent channel communicates with the vent hole, a position where the front vent channel communicates with the vent hole, and a position where the sound receiving channel communicates with the vent hole are arranged in sequence in the length direction of the vent hole.

In an embodiment, the vent frame includes a rear frame body and a front frame body.

The rear frame body is provided with a rear communication groove. The rear communication groove and the rear housing are assembled to form a first rear communication channel in an enclosing manner. The first rear communication channel communicates with the rear sound chamber. The groove bottom of the rear communication groove is provided with a second rear communication channel. The second rear communication channel communicates with the vent hole.

The front frame body is provided with a front communication groove. The front communication groove and the front housing are assembled to form a first front communication channel in an enclosing manner. The first front communication channel communicates with the front sound chamber. The groove bottom of the front communication groove is provided with a second front communication channel. The rear frame body is further provided with a third front communication channel communicating with the vent hole. The second front communication channel communicates with the third front communication channel.

In an embodiment, the vent frame further includes a sealing gasket interposed between the rear frame body and the front frame body. The second front communication channel communicates with the third front communication channel through the sealing gasket.

In an embodiment, the accommodation groove is provided with a rear assembly groove. The groove wall on a side of the rear assembly groove is provided with a through hole communicating with the rear chamber groove. The rear communication groove and the rear assembly groove are assembled to form the first rear communication channel in an enclosing manner.

In an embodiment, the accommodation groove is provided with an insertion channel. The rear frame body is inserted into the insertion channel. The sliding direction of the rear frame body in the insertion channel is disposed at an included angle with the through direction of the vent hole.

In an embodiment, the front housing is provided with a front assembly groove. The groove wall on a side of the front assembly groove is provided with a through hole communicating with the front sound chamber. The front communication groove and the front assembly groove are assembled to form the first front communication channel in an enclosing manner.

In an embodiment, a dust-proof assembly is interposed between the vent frame and the rear housing. Both the rear vent channel and the front vent channel communicate with the vent hole through the dust-proof assembly.

In an embodiment, a dust-proof assembly is disposed on the inner wall of the rear chamber groove. The rear vent channel communicates with the rear sound chamber through the dust-proof assembly.

The beneficial effects of the present disclosure are described below.

The rear sound chamber located on the rear side of the speaker assembly and the front sound chamber located on the front side of the front housing are separated by the accommodation groove, and the spacing is relatively large. The vent frame is disposed in the accommodation groove, so that the space in the accommodation groove is fully utilized. The vent frame and the rear housing are assembled to form the rear vent channel in an enclosing manner, and the vent frame and the front housing are assembled to form the front vent channel in an enclosing manner. In this manner, the disposing positions of the rear vent channel and the front vent channel are more accurate. The rear vent channel and the front vent channel are integrated on the vent frame. Thus, the number of structural components is reduced. Moreover, the assembly process is simplified, and the production and assembly costs are reduced. Both the rear vent channel and the front vent channel communicate with the outside through the vent hole on the outer wall of the rear housing, and vent directions are the same, thereby ensuring the appearance of the product.

REFERENCE LIST

Figure 1:
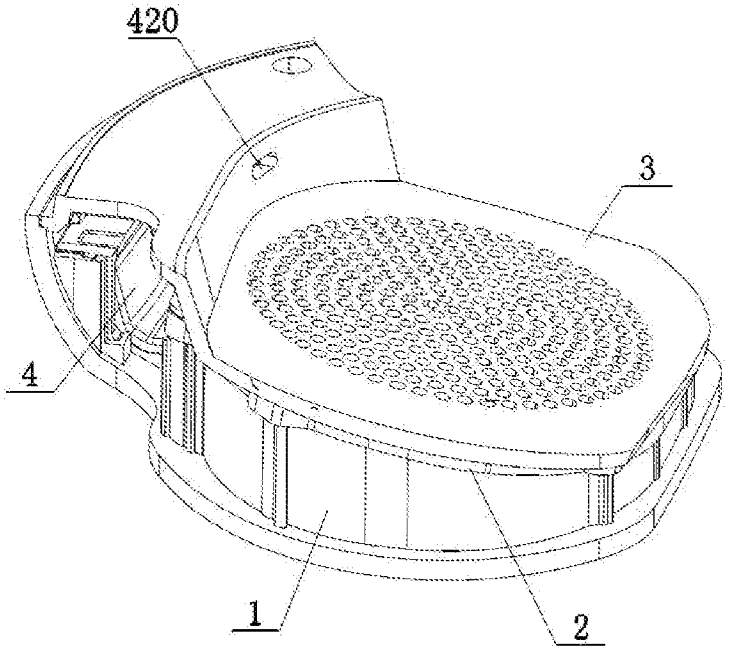
FIG. 1 is a view illustrating the partial structure of a sound generating apparatus according to an embodiment of the present disclosure.

1 rear housing
11 accommodation groove
12 rear chamber groove
13 vent hole
14 rear assembly groove
15 insertion channel
2 speaker assembly
3 front housing
31 front assembly groove
4 vent frame
410 rear vent channel
420 front vent channel
430 sound receiving channel
41 rear frame body
411 rear communication groove
412 second rear communication channel
413 third front communication channel
42 front frame body
421 front communication groove
422 second front communication channel
43 sealing gasket
5 dust-proof assembly
51 mesh fabric
52 support gasket

DETAILED DESCRIPTION

Embodiments of the present disclosure are described in detail below. Examples of the embodiments are illustrated in the drawings, where the same or similar reference numerals indicate the same or similar parts or indicate parts having the same or similar functions. The embodiments described hereinafter with reference to the drawings are merely exemplary. The embodiments are intended to explain the present disclosure and are not to be construed as limiting the present disclosure.

In the description of the present disclosure, unless otherwise expressly specified and limited, the term "connected to each other", "connected" or "secured" is to be construed in a broad sense, for example, as securely connected or detachably connected; mechanically connected or electrically connected; directly connected to each other or indirectly connected to each other via an intermediary; or internally connected between two elements or interactional relations between two elements. For those of ordinary skilled in the art, the preceding terms may be construed according to specific circumstances in the present disclosure.

In the description of the present disclosure, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

Technical solutions of the present disclosure are further described hereinafter in conjunction with the drawings and the specific implementations.

Figure 2:
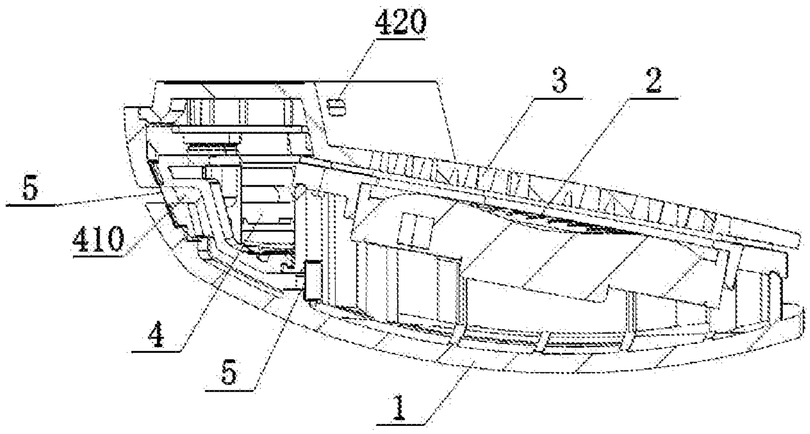
FIG. 2 is a section view of an orientation of a sound generating apparatus according to an embodiment of the present disclosure.
Figure 3:
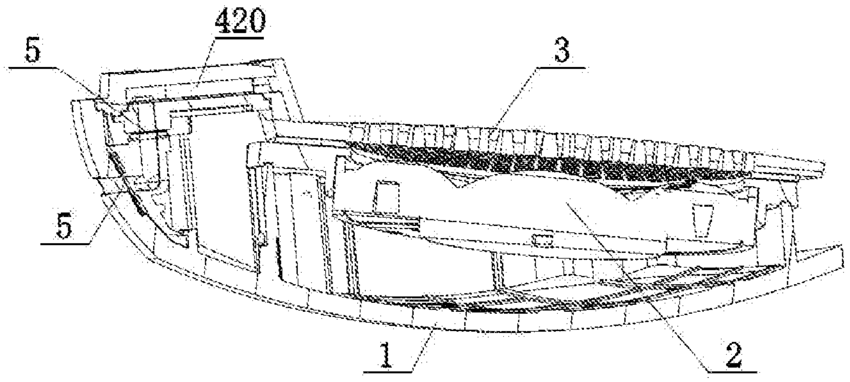
FIG. 3 is a section view of another orientation of a sound generating apparatus according to an embodiment of the present disclosure.
Figure 4:
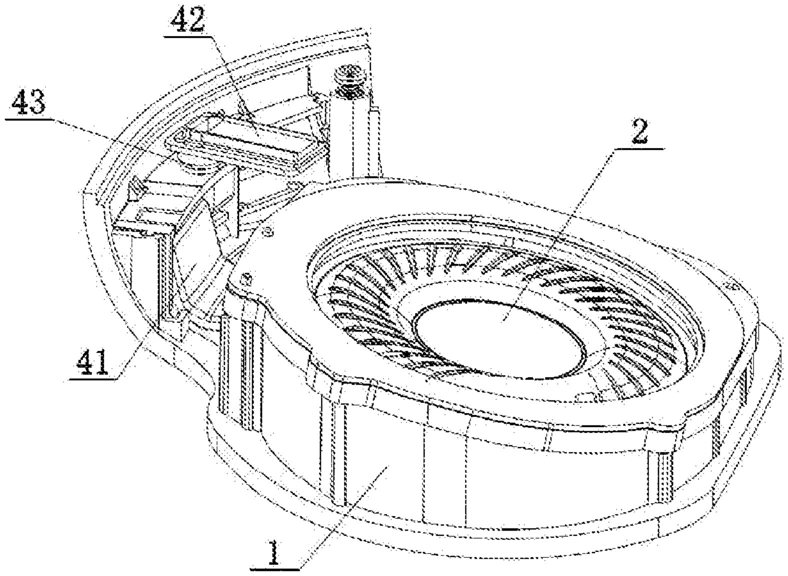
FIG. 4 is a view illustrating the structure of the sound generating apparatus in FIG. 1 omitting a front housing.
Figure 5:
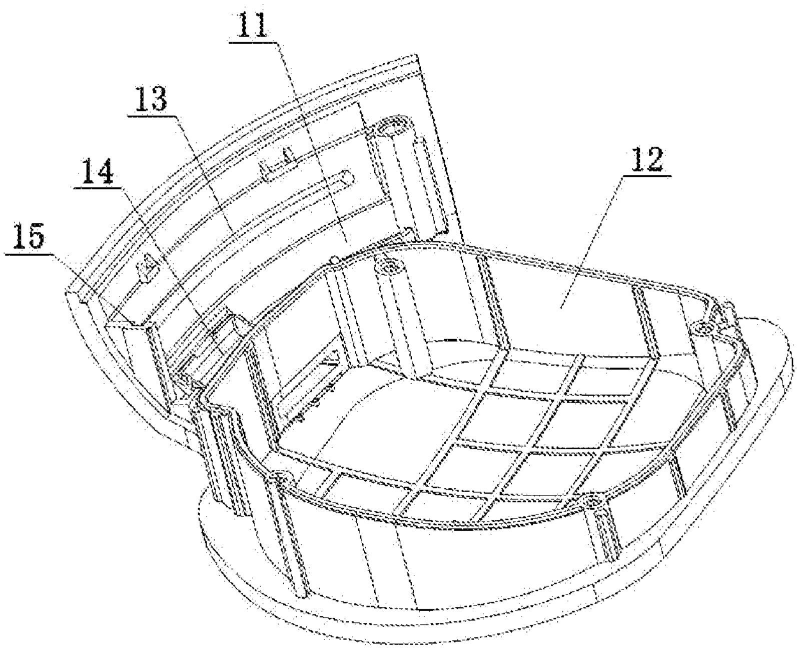
FIG. 5 is a view illustrating the structure of a rear housing according to an embodiment of the present disclosure.
Figure 6:
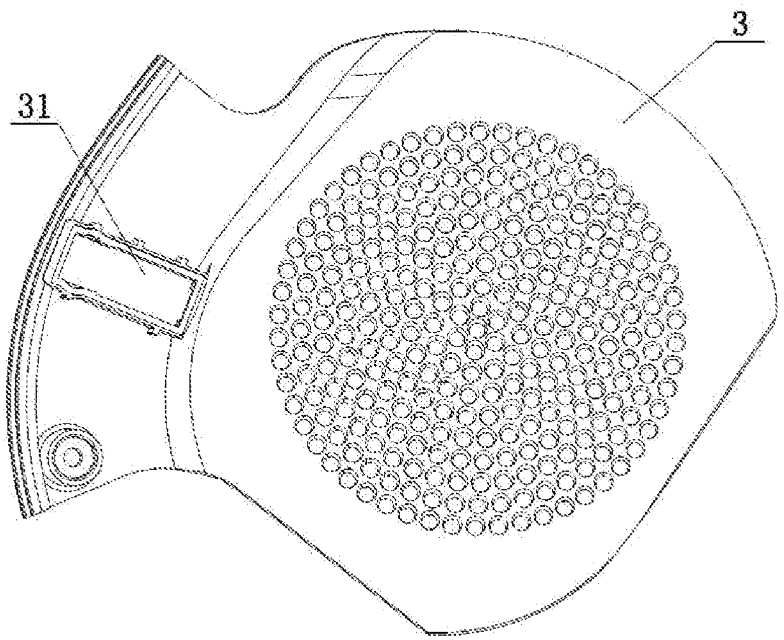
FIG. 6 is a view illustrating the structure of a front housing according to an embodiment of the present disclosure.
Figure 7:
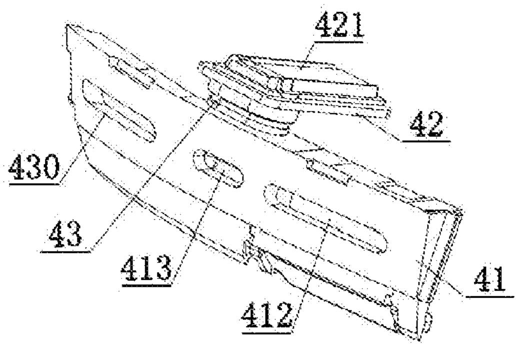
FIG. 7 is a view illustrating the structure of a vent frame according to an embodiment of the present disclosure.
Figure 8:
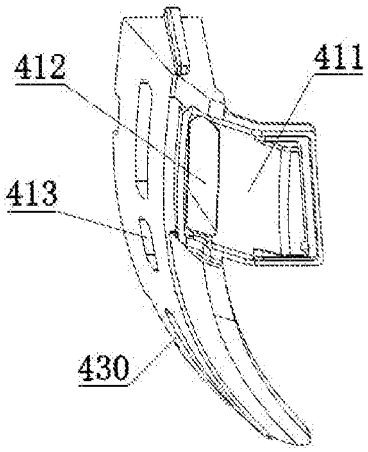
FIG. 8 is a view illustrating the structure of a rear frame body according to an embodiment of the present disclosure.
Figure 9:
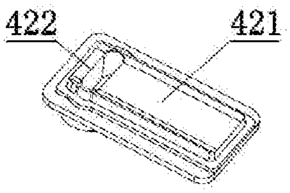
FIG. 9 is a view illustrating the structure of a front frame body according to an embodiment of the present disclosure.
Figure 10:
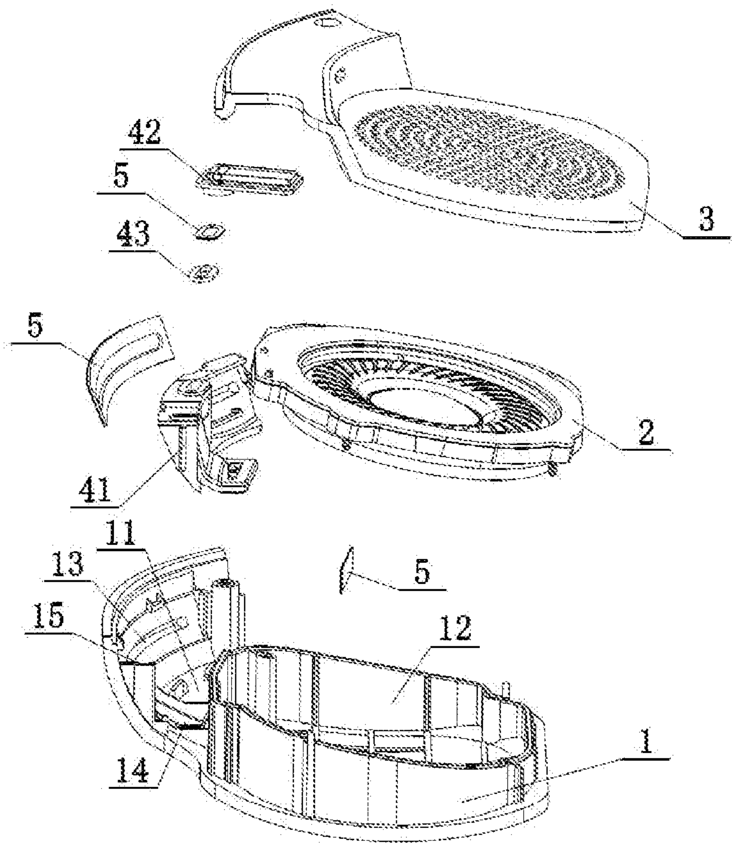
FIG. 10 is an exploded view of a sound generating apparatus according to an embodiment of the present disclosure.
Figure 11:
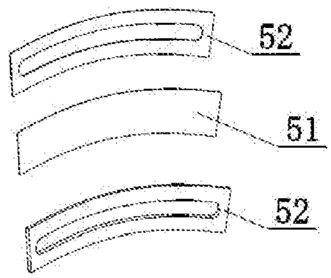
FIG. 11 is an exploded view of a dust-proof assembly between a rear frame body and a rear housing according to an embodiment of the present disclosure.

As shown in FIGS. 1 to 11, the present disclosure provides a sound generating apparatus. The sound generating apparatus includes a rear housing 1, a speaker assembly 2, a front housing 3, and a vent frame 4. The rear housing 1 is provided with an accommodation groove 11 and a rear chamber groove 12. The outer wall of the rear housing 1 is provided with a vent hole 13 communicating with the accommodation groove 11. The speaker assembly 2 is disposed in the notch of the rear chamber groove 12 and covers the rear chamber groove 12 to form a rear sound chamber. The front housing 3 covers the rear housing 1. The speaker assembly 2 is interposed between the front housing 3 and the notch of the rear chamber groove 12. A front sound chamber is formed on the side of the front housing 3 facing away from the speaker assembly 2. The vent frame 4 is disposed in the accommodation groove 11 and interposed between the rear housing 1 and the front housing 3. The vent frame 4 and the rear housing 1 are assembled to form a rear vent channel 410 in an enclosing manner. One end of the rear vent channel 410 communicates with the rear sound chamber, and the other end of the rear vent channel 410 communicates with the vent hole 13. The vent frame 4 and the front housing 3 are assembled to form a front vent channel 420 in an enclosing manner. One end of the front vent channel 420 communicates with the front sound chamber, and the other end of the front vent channel 420 communicates with the vent hole 13.

In the present disclosure, the rear sound chamber located on the rear side of the speaker assembly 2 and the front sound chamber located on the front side of the front housing 3 are separated by the accommodation groove 11, and the spacing is relatively large. The vent frame 4 is disposed in the accommodation groove 11, so that the space in the accommodation groove 11 is fully utilized. The vent frame 4 and the rear housing 1 are assembled to form the rear vent channel 410 in an enclosing manner, and the vent frame 4 and the front housing 3 are assembled to form the front vent channel 420 in an enclosing manner. In this manner, the disposing positions of the rear vent channel 410 and the front vent channel 420 are more accurate. The rear vent channel 410 and the front vent channel 420 are integrated on the vent frame 4. Thus, the number of structural components is reduced. Moreover, the assembly process is simplified, and the production and assembly costs are reduced. Both the rear vent channel 410 and the front vent channel 420 communicate with the outside through the vent hole 13 on the outer wall of the rear housing 1, and vent directions are the same, thereby ensuring the appearance of the product.

In an embodiment, the vent frame 4 is further provided with a sound receiving channel 430. One end of the sound receiving channel 430 communicates with the vent hole 13, and the other end of the sound receiving channel 430 communicates with the accommodation groove 11. Generally, a microphone is further disposed in the accommodation groove 11 of the sound generating apparatus. The sound receiving channel 430 is integrated on the vent frame 4, so that the microphone can receive sounds more reliably.

In an embodiment, the vent hole 13 is in a strip shape. A position where the rear vent channel 410 communicates with the vent hole 13, a position where the front vent channel 420 communicates with the vent hole 13, and a position where the sound receiving channel 430 communicates with the vent hole 13 are arranged in sequence in the length direction of the vent hole 13. With the preceding disposition, the sound receiving channel 430 communicates with an end of the vent hole 13 and is less affected by the rear vent channel 410 and the front vent channel 420.

In this embodiment, in the length direction of the vent hole 13, the communication length between the rear vent channel 410 and the vent hole 13 is equal to the communication length between the sound receiving channel 430 and the vent hole 13, and the communication length between the font vent channel 420 and the vent hole 13 is less than the communication length between the rear vent channel 410 and the vent hole 13.

In an embodiment, the vent frame 4 includes a rear frame body 41 and a front frame body 42. The rear frame body 41 is provided with a rear communication groove 411. The rear communication groove 411 and the rear housing 1 are assembled to form a first rear communication channel in an enclosing manner. The first rear communication channel communicates with the rear sound chamber. The groove bottom of the rear communication groove 411 is provided with a second rear communication channel 412. The second rear communication channel 412 communicates with the vent hole 13. The first rear communication channel and the second rear communication channel 412 that communicate with each other form the rear vent channel 410. The front frame body 42 is provided with a front communication groove 421. The front communication groove 421 and the front housing 3 are assembled to form a first front communication channel in an enclosing manner. The first front communication channel communicates with the front sound chamber. The groove bottom of the front communication groove 421 is provided with a second front communication channel 422. The rear frame body 41 is further provided with a third front communication channel 413 communicating with the vent hole 13. The second front communication channel 422 communicates with the third front communication channel 413. The first front communication channel, the second front communication channel 422, and the third front communication channel 413 communicating sequentially form the front vent channel 420. With the preceding disposition, the number of structural components is reduced. Moreover, the assembly process is simplified, and the production and assembly costs are reduced.

In an embodiment, the vent frame 4 further includes a sealing gasket 43 interposed between the rear frame body 41 and the front frame body 42. The second front communication channel 422 communicates with the third front communication channel 413 through the sealing gasket 43. The sealing gasket 43 is disposed to enable the second front communication channel 422 to communicate with the third front communication channel 413 more safely and reliably.

In an embodiment, the accommodation groove 11 is provided with a rear assembly groove 14. The groove wall on a side of the rear assembly groove 14 is provided with a through hole communicating with the rear chamber groove 12. The rear communication groove 411 and the rear assembly groove 14 are assembled to form the first rear communication channel in an enclosing manner. The rear assembly groove 14 is disposed to enable the rear frame body 41 to be positioned and mounted on the rear housing 1.

In an embodiment, the accommodation groove 11 is provided with an insertion channel 15. The rear frame body 41 is inserted into the insertion channel 15. The sliding direction of the rear frame body 41 in the insertion channel 15 is disposed at an included angle with the through direction of the vent hole 13. With the preceding disposition, the positioning and mounting accuracy of the rear frame body 41 on the rear housing 1 is further ensured, so that the rear frame body 41 may be reliably assembled on the rear housing 1 without relying on fasteners.

In an embodiment, the front housing 3 is provided with a front assembly groove 31. The groove wall on a side of the front assembly groove 31 is provided with a through hole communicating with the front sound chamber. The front communication groove 421 and the front assembly groove 31 are assembled to form the first front communication channel in an enclosing manner. The front assembly groove 31 is disposed to enable the front frame body 42 to be positioned and mounted on the front housing 3.

In this embodiment, during assembly, the front frame body 42 partially extends into the front assembly groove 31, so that the positioning is more accurate.

In an embodiment, a dust-proof assembly 5 is interposed between the vent frame 4 and the rear housing 1. Both the rear vent channel 410 and the front vent channel 420 communicate with the vent hole 13 through the dust-proof assembly 5. The dust-proof assembly 5 is disposed, so that it is possible to prevent the intrusion of foreign matter such as dust.

In an embodiment, a dust-proof assembly 5 is disposed on the inner wall of the rear chamber groove 12. The rear vent channel 410 communicates with the rear sound chamber through the dust-proof assembly 5. The dust-proof assembly 5 is disposed, so that it is possible to prevent the intrusion of foreign matter such as dust, thereby ensuring the safety of the rear sound chamber.

In an embodiment, a dust-proof assembly 5 is interposed between the sealing gasket 43 and the front frame body 42. The second front communication channel 422 communicates with the sealing gasket 43 through the dust-proof assembly 5. The dust-proof assembly 5 is disposed, so that it is possible to prevent the intrusion of foreign matter such as dust.

In this embodiment, the dust-proof assembly 5 includes a mesh fabric 51 and a support gasket 52. The dust-proof assembly 5 between the rear frame body 41 of the vent frame 4 and the rear housing 1 includes two support gaskets 52 and a mesh fabric 51 interposed between the two support gaskets 52. The two support gaskets 52 are ringed on the periphery of the vent hole 13 to support the mesh fabric 51 between the two support gaskets 52, so that the mesh fabric 51 covers the vent hole 13. The dust-proof assembly 5 on the inner wall of the rear chamber groove 12 includes a support gasket 52 and a mesh fabric 51 connected to the support gasket 52. The inner wall of the rear chamber groove 12 is provided with a slot. The support gasket 52 is engaged in the slot and is ringed on the periphery of the communication port between the rear vent channel 410 and the rear sound chamber. The mesh fabric 51 covers the communication port between the rear vent channel 410 and the rear sound chamber. The dust-proof assembly 5 between the sealing gasket 43 and the front frame body 42 includes two support gaskets 52 and a mesh fabric 51 interposed between the two support gaskets 52. The two support gaskets 52 are ringed on the periphery of the communication port between the sealing gasket 43 and the second front communication channel 422 to support the mesh fabric 51 between the two support gaskets 52, so that the mesh fabric 51 covers the communication port between the sealing gasket 43 and the second front communication channel 422.

In an embodiment, the sound generating apparatus is a headset. The front housing 3 is provided with a first step face, a second step face, and a connection side face. The first step face and the second step face are parallel to each other. The connection side face is a transition surface of the first step face and the second step face. The first step face faces the speaker assembly 2 and is provided with multiple sound generating holes. The second step face is configured to mount an elastic gasket in contact with a user. The communication port between the front vent channel 420 and the front sound chamber is located on the connection side face. The structures and the working principles of the speaker assembly 2 and the microphone refer to the related art, and the details are not repeated here.

Apparently, the preceding embodiments of the present disclosure are only illustrative of the present disclosure and are not intended to limit the implementations of the present disclosure. For those of ordinary skill in the art, changes or alterations in other different forms may also be made based on the preceding description. All implementations cannot be and do not need to be exhausted herein. Any modifications, equivalent substitutions, and improvements made within the spirit and principle of the present disclosure fall within the scope of the claims of the present disclosure.

What is claimed is:

1. A sound generating apparatus, comprising:

a rear housing provided with an accommodation groove and a rear chamber groove, wherein an outer wall of the rear housing is provided with a vent hole communicating with the accommodation groove;

a speaker assembly disposed in a notch of the rear chamber groove and covering the rear chamber groove to form a rear sound chamber;

a front housing covering the rear housing, wherein the speaker assembly is interposed between the front housing and the notch of the rear chamber groove, and a front sound chamber is formed on a side of the front housing facing away from the speaker assembly; and a vent frame disposed in the accommodation groove and interposed between the rear housing and the front housing, wherein the vent frame and the rear housing are assembled to form a rear vent channel in an enclosing manner, one end of the rear vent channel communicates with the rear sound chamber, and another end of the rear vent channel communicates with the vent hole; and the vent frame and the front housing are assembled to form a front vent channel in an enclosing manner, one end of the front vent channel communicates with the front sound chamber, and another end of the front vent channel communicates with the vent hole.

2. The sound generating apparatus according to claim 1, wherein the vent frame is further provided with a sound receiving channel, one end of the sound receiving channel communicates with the vent hole, and another end of the sound receiving channel communicates with the accommodation groove.

3. The sound generating apparatus according to claim 2, wherein the vent hole is in a strip shape, and a position where the rear vent channel communicates with the vent hole, a position where the front vent channel communicates with the vent hole, and a position where the sound receiving channel communicates with the vent hole are arranged in sequence in a length direction of the vent hole.

4. The sound generating apparatus according to claim 1, wherein the vent frame comprises:

a rear frame body provided with a rear communication groove, wherein the rear communication groove and the rear housing are assembled to form a first rear communication channel in an enclosing manner, the first rear communication channel communicates with the rear sound chamber, a groove bottom of the rear communication groove is provided with a second rear communication channel, and the second rear communication channel communicates with the vent hole; and a front frame body provided with a front communication groove, wherein the front communication groove and the front housing are assembled to form a first front communication channel in an enclosing manner, the first front communication channel communicates with the front sound chamber, a groove bottom of the front communication groove is provided with a second front communication channel, the rear frame body is further provided with a third front communication channel communicating with the vent hole, and the second front communication channel communicates with the third front communication channel.

5. The sound generating apparatus according to claim 4, wherein the vent frame further comprises a sealing gasket interposed between the rear frame body and the front frame body, and the second front communication channel communicates with the third front communication channel through the sealing gasket.

6. The sound generating apparatus according to claim 4, wherein a rear assembly groove is provided in the accommodation groove, a groove wall on a side of the rear assembly groove is provided with a through hole communicating with the rear chamber groove, and the rear communication groove and the rear assembly groove are assembled to form the first rear communication channel in an enclosing manner.

7. The sound generating apparatus according to claim 4, wherein the accommodation groove is provided with an insertion channel, the rear frame body is inserted into the insertion channel, and a sliding direction of the rear frame body in the insertion channel is disposed at an included angle with a through direction of the vent hole.

8. The sound generating apparatus according to claim 4, wherein the front housing is provided with a front assembly groove, a groove wall on a side of the front assembly groove is provided with a through hole communicating with the front sound chamber, and the front communication groove and the front assembly groove are assembled to form the first front communication channel in an enclosing manner.

9. The sound generating apparatus according to claim 1, wherein a dust-proof assembly is interposed between the vent frame and the rear housing, and both the rear vent channel and the front vent channel communicate with the vent hole through the dust-proof assembly.

10. The sound generating apparatus according to claim 1, wherein a dust-proof assembly is disposed on an inner wall of the rear chamber groove, and the rear vent channel communicates with the rear sound chamber through the dust-proof assembly.

11. The sound generating apparatus according to claim 2, wherein a dust-proof assembly is disposed on an inner wall of the rear chamber groove, and the rear vent channel communicates with the rear sound chamber through the dust-proof assembly.

12. The sound generating apparatus according to claim 3, wherein a dust-proof assembly is disposed on an inner wall of the rear chamber groove, and the rear vent channel communicates with the rear sound chamber through the dust-proof assembly.

13. The sound generating apparatus according to claim 4, wherein a dust-proof assembly is disposed on an inner wall of the rear chamber groove, and the rear vent channel communicates with the rear sound chamber through the dust-proof assembly.

14. The sound generating apparatus according to claim 5, wherein a dust-proof assembly is disposed on an inner wall of the rear chamber groove, and the rear vent channel communicates with the rear sound chamber through the dust-proof assembly.

15. The sound generating apparatus according to claim 6, wherein a dust-proof assembly is disposed on an inner wall of the rear chamber groove, and the rear vent channel communicates with the rear sound chamber through the dust-proof assembly.

16. The sound generating apparatus according to claim 7, wherein a dust-proof assembly is disposed on an inner wall of the rear chamber groove, and the rear vent channel communicates with the rear sound chamber through the dust-proof assembly.

17. The sound generating apparatus according to claim 8, wherein a dust-proof assembly is disposed on an inner wall of the rear chamber groove, and the rear vent channel communicates with the rear sound chamber through the dust-proof assembly.

18. The sound generating apparatus according to claim 9, wherein a dust-proof assembly is disposed on an inner wall of the rear chamber groove, and the rear vent channel communicates with the rear sound chamber through the dust-proof assembly.

* * * * *